United States Patent
Kubouchi et al.

(10) Patent No.: US 10,164,523 B2
(45) Date of Patent: Dec. 25, 2018

(54) BOOST CHOPPER CIRCUIT

(71) Applicant: FUJI ELECTRIC CO., LTD., Kawasaki-shi, Kanagawa (JP)

(72) Inventors: Motoyoshi Kubouchi, Matsumoto (JP); Hao Hou, Kobe (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 21 days.

(21) Appl. No.: 15/468,369

(22) Filed: Mar. 24, 2017

(65) Prior Publication Data

US 2017/0331367 A1      Nov. 16, 2017

(30) Foreign Application Priority Data

May 12, 2016    (JP) .................. 2013-096404

(51) Int. Cl.
*H02M 3/07*    (2006.01)
*H02M 3/158*    (2006.01)

(52) U.S. Cl.
CPC ............. *H02M 3/07* (2013.01); *H02M 3/158* (2013.01)

(58) Field of Classification Search
None
See application file for complete search history.

(56) References Cited

U.S. PATENT DOCUMENTS

| 7,965,069 B2 | 6/2011 | Watanabe et al. |
| 2015/0222207 A1* | 8/2015 | Matsushita ............... B66F 9/02 318/376 |
| 2016/0056715 A1* | 2/2016 | Arisawa .................. H02M 1/34 323/282 |

FOREIGN PATENT DOCUMENTS

JP    2008-236863 A    10/2008

* cited by examiner

*Primary Examiner* — Cassandra Cox
(74) *Attorney, Agent, or Firm* — Manabu Kanesaka

(57) ABSTRACT

In a boost chopper circuit, a withstand voltage of at least one device of a switching device circuit is lower than a withstand voltage of a capacitor circuit connected in series to a backflow prevention diode circuit between opposite ends of the switching device circuit.

11 Claims, 4 Drawing Sheets

FIRST EMBODIMENT

FIRST EMBODIMENT

SECOND EMBODIMENT

THIRD EMBODIMENT

FOURTH EMBODIMENT

MODIFICATION OF FOURTH EMBODIMENT

MODIFICATION OF FIRST EMBODIMENT

MODIFICATION OF SECOND EMBODIMENT

MODIFICATION OF THIRD EMBODIMENT

BOOST CHOPPER CIRCUIT

CROSS-REFERENCE TO RELATED APPLICATION

The priority application number JP2016-096404, Boost Chopper Circuit, May 12, 2016, Motoyoshi Kubouchi and Hao Hou, upon which this patent application is based, is hereby incorporated by reference.

BACKGROUND OF THE INVENTION

Field of the Invention

The present invention relates to a boost chopper circuit, and more particularly, it relates to a boost chopper circuit including a switching device circuit and a capacitor.

Description of the Background Art

A boost chopper circuit including a switching device circuit and a capacitor is known in general, as disclosed in Japanese Patent Laying-Open No. 2008-236863.

Japanese Patent Laying-Open No. 2008-236863 discloses a boost chopper circuit including a direct-current output circuit (DC power supply), a reactor (inductor), capacitors, and a plurality of switches. This boost chopper circuit is configured to boost an input voltage by selecting and allowing the reactor and the capacitors to function by switching the plurality of switches.

In the boost chopper circuit described in Japanese Patent Laying-Open No. 2008-236863, a series resonant current flows from the direct-current output circuit (DC power supply) to the reactor (inductor) and the capacitors through a switch having a short-circuit fault when a predetermined switch of the plurality of switches has a short-circuit fault. In this case, the switch has a short-circuit fault, and hence the series resonant current is uncontrollable. Consequently, voltages equal to or more than the withstand voltages of the capacitors are applied to the capacitors such that the capacitors disadvantageously fail.

SUMMARY OF THE INVENTION

The present invention has been proposed in order to solve the aforementioned problem, and an object of the present invention is to provide a boost chopper circuit that significantly reduces or prevents the failure of a capacitor while significantly reducing or preventing the application of a voltage equal to or more than the withstand voltage of the capacitor to the capacitor.

A boost chopper circuit according to an aspect of the present invention includes a reactor, a switching device circuit connected to opposite ends of a direct-current output circuit through the reactor, a backflow prevention diode circuit connected in series to the switching device circuit, and a capacitor circuit connected in series to the backflow prevention diode circuit between opposite ends of the switching device circuit, and a withstand voltage of at least one device of the switching device circuit is lower than a withstand voltage of the capacitor circuit.

In the boost chopper circuit according to this aspect of the present invention, as hereinabove described, the withstand voltage of at least one device of the switching device circuit is lower than the withstand voltage of the capacitor circuit, whereby when a voltage substantially equal to the withstand voltage of the device of the switching device circuit lower than the withstand voltage of the capacitor circuit is applied to each of the capacitor circuit and each device of the switching device circuit, the capacitor circuit does not fail, but the device of the switching device circuit fails. Consequently, the failing device of the switching device circuit is short-circuited such that a series resonant current flows through the short-circuited device of the switching device circuit but not through the capacitor circuit. Thus, the application of a voltage equal to or more than the withstand voltage of the capacitor circuit to the capacitor circuit can be significantly reduced or prevented, and the failure of the capacitor circuit can be significantly reduced or prevented.

In the aforementioned boost chopper circuit according to this aspect, the at least one device of the switching device circuit, the withstand voltage of which is lower than the withstand voltage of the capacitor circuit, preferably includes a device constructed of a semiconductor other than a wide band gap semiconductor. The semiconductor other than the wide band gap semiconductor is generally less expensive than the wide band gap semiconductor, and the withstand voltage of the semiconductor other than the wide band gap semiconductor is lower than the withstand voltage of the wide band gap semiconductor. Therefore, as compared with the case where the device of the switching device circuit is constructed of the wide band gap semiconductor, at least one device of the switching device circuit, which is less expensive, fails first, and hence a series resonant current flows through the short-circuited device of the switching device circuit such that the failure of the capacitor circuit can be relatively easily and significantly reduced or prevented.

Furthermore, the semiconductor other than the wide band gap semiconductor is less expensive than the wide band gap semiconductor. Therefore, a device constructed of the semiconductor other than the wide band gap semiconductor is applied to one device of the switching device circuit, whereby the boost chopper circuit can be inexpensively manufactured. When the failing semiconductor other than the wide band gap semiconductor is replaced, the replacement costs can be reduced as compared with the case where a device constructed of the wide band gap semiconductor is replaced.

In the aforementioned boost chopper circuit according to this aspect, the switching device circuit preferably includes a first switching device, and a withstand voltage of the first switching device is preferably lower than the withstand voltage of the capacitor circuit. According to this structure, when a voltage substantially equal to the withstand voltage of the first switching device lower than the withstand voltage of the capacitor circuit is applied to each of the capacitor circuit and the first switching device, the capacitor circuit does not fail, but the first switching device fails. Consequently, a series resonant current flows through the short-circuited first switching device but not through the capacitor circuit. Thus, the application of a voltage equal to or more than the withstand voltage of the capacitor circuit to the capacitor circuit can be significantly reduced or prevented, and the failure of the capacitor circuit can be significantly reduced or prevented.

In the aforementioned boost chopper circuit according to this aspect, the switching device circuit preferably includes a first switching device and an antiparallel diode element connected in anti-parallel to the first switching device, and a withstand voltage of the antiparallel diode element is preferably lower than the withstand voltage of the capacitor circuit. According to this structure, when a voltage substantially equal to the withstand voltage of the antiparallel diode element lower than the withstand voltage of the capacitor circuit is applied to each of the capacitor circuit and the antiparallel diode element, the capacitor circuit does not fail, but the antiparallel diode element fails. Consequently, a series resonant current flows through the short-circuited antiparallel diode element but not through the capacitor circuit. Thus, the application of a voltage equal to or more than the withstand voltage of the capacitor circuit to the capacitor circuit can be easily significantly reduced or prevented, and the failure of the capacitor circuit can be easily significantly reduced or prevented.

In this case, the first switching device preferably includes a switching device constructed of a wide band gap semiconductor, and the antiparallel diode element preferably includes an antiparallel diode constructed of a semiconductor other than the wide band gap semiconductor. According to this structure, the switching device constructed of the wide band gap semiconductor is used for the first switching device, whereby a switching loss can be reduced as compared with the case where a switching device constructed of a common silicon semiconductor is used. Consequently, an electric power loss can be reduced when the boost chopper circuit is driven.

In the aforementioned boost chopper circuit according to this aspect, the switching device circuit preferably includes a first switching device and a second switching device connected in parallel to the first switching device, and a withstand voltage of the second switching device is preferably lower than the withstand voltage of the capacitor circuit. According to this structure, when a voltage substantially equal to the withstand voltage of the second switching device lower than the withstand voltage of the capacitor circuit is applied to each of the capacitor circuit and the second switching device, the capacitor circuit does not fail, but the second switching device fails. Consequently, a series resonant current flows through the short-circuited second switching device but not through the capacitor circuit. Thus, the application of a voltage equal to or more than the withstand voltage of the capacitor circuit to the capacitor circuit can be easily significantly reduced or prevented, and the failure of the capacitor circuit can be easily significantly reduced or prevented.

In this case, the first switching device preferably includes a switching device constructed of a wide band gap semiconductor, and the second switching device preferably includes a switching device constructed of a semiconductor other than the wide band gap semiconductor. According to this structure, the semiconductor other than the wide band gap semiconductor is used for the second switching device, whereby the withstand voltage of the second switching device can be easily rendered lower than the withstand voltage of the first switching device and the withstand voltage of the capacitor circuit.

In the aforementioned boost chopper circuit in which the switching device circuit includes the first switching device, the first switching device preferably includes a first switch and a second switch connected in series to the first switch, the backflow prevention diode circuit preferably includes a first backflow prevention diode connected in series to the first switch and a second backflow prevention diode connected in series to the second switch, the capacitor circuit preferably includes a first capacitor connected in series to the first backflow prevention diode and a second capacitor connected in series to the second backflow prevention diode between the opposite ends of the switching device circuit, a first connection that connects the first switch to the second switch and a second connection that connects the first capacitor to the second capacitor are preferably connected to each other, and a withstand voltage of the first switch is preferably lower than a withstand voltage of the first capacitor while a withstand voltage of the second switch is preferably lower than a withstand voltage of the second capacitor. According to this structure, when a voltage substantially equal to the withstand voltage of the first switch lower than the withstand voltage of the first capacitor is applied to each of the first capacitor and the first switch, the first capacitor does not fail, but the first switch fails. When a voltage substantially equal to the withstand voltage of the second switch lower than the withstand voltage of the second capacitor is applied to each of the second capacitor and the second switch, the second capacitor does not fail, but the second switch fails. Consequently, the application of a voltage equal to or more than the withstand voltage of each of the capacitors to each of the capacitors can be significantly reduced or prevented, and the failure of each of the capacitors can be significantly reduced or prevented.

In the aforementioned boost chopper circuit in which the switching device circuit includes the antiparallel diode element, the first switching device preferably includes a first switch and a second switch connected in series to the first switch, the backflow prevention diode circuit preferably includes a first backflow prevention diode connected in series to the first switch and a second backflow prevention diode connected in series to the second switch, the capacitor circuit preferably includes a first capacitor connected in series to the first backflow prevention diode and a second capacitor connected in series to the second backflow prevention diode between the opposite ends of the switching device circuit, the antiparallel diode element preferably includes a first antiparallel diode connected in anti-parallel to the first switch and a second antiparallel diode connected in anti-parallel to the second switch, a first connection that connects the first switch to the second switch and a second connection that connects the first capacitor to the second capacitor are preferably connected to each other, and a withstand voltage of the first antiparallel diode is preferably lower than a withstand voltage of the first capacitor while a withstand voltage of the second antiparallel diode is preferably lower than a withstand voltage of the second capacitor. According to this structure, when a voltage substantially equal to the withstand voltage of the first antiparallel diode lower than the withstand voltage of the first capacitor is applied to each of the first capacitor and the first antiparallel diode, the first capacitor does not fail, but the first antiparallel diode fails. When a voltage substantially equal to the withstand voltage of the second antiparallel diode lower than the withstand voltage of the second capacitor is applied to each of the second capacitor and the second antiparallel diode, the second capacitor does not fail, but the second antiparallel diode fails. Consequently, the application of a voltage equal to or more than the withstand voltage of each of the capacitors to each of the capacitors can be easily significantly reduced or prevented, and the failure of each of the capacitors can be easily significantly reduced or prevented.

In the aforementioned boost chopper circuit in which the switching device circuit includes the second switching device, the first switching device preferably includes a first switch and a second switch connected in series to the first switch, the backflow prevention diode circuit preferably includes a first backflow prevention diode connected in series to the first switch and a second backflow prevention diode connected in series to the second switch, the capacitor circuit preferably includes a first capacitor connected in series to the first backflow prevention diode and a second capacitor connected in series to the second backflow prevention diode between the opposite ends of the switching device circuit, the second switching device preferably includes a third switch connected in parallel to the first switch and a fourth switch connected in parallel to the second switch, a first connection that connects the first switch to the second switch and a second connection that connects the first capacitor to the second capacitor are preferably connected to each other, and a withstand voltage of the third switch is preferably lower than a withstand voltage of the first capacitor while a withstand voltage of the fourth switch is preferably lower than a withstand voltage of the second capacitor. According to this structure, when a voltage substantially equal to the withstand voltage of the third switch lower than the withstand voltage of the first capacitor is applied to each of the first capacitor and the third switch, the first capacitor does not fail, but the third switch fails. When a voltage substantially equal to the withstand voltage of the fourth switch lower than the withstand voltage of the second capacitor is applied to each of the second capacitor and the fourth switch, the second capacitor does not fail, but the fourth switch fails. Consequently, the application of a voltage equal to or more than the withstand voltage of each of the capacitors to each of the capacitors can be easily significantly reduced or prevented, and the failure of each of the capacitors can be easily significantly reduced or prevented.

In the aforementioned boost chopper circuit in which the switching device circuit includes the second switching device, the first switching device preferably includes a first switch and a second switch connected in series to the first switch, the backflow prevention diode circuit preferably includes a first backflow prevention diode connected in series to the first switch and a second backflow prevention diode connected in series to the second switch, the capacitor circuit preferably includes a first capacitor connected in series to the first backflow prevention diode and a second capacitor connected in series to the second backflow prevention diode between the opposite ends of the switching device circuit, the second switching device preferably includes a single fifth switch connected in parallel to the first switching device, a first connection that connects the first switch to the second switch and a second connection that connects the first capacitor to the second capacitor are preferably connected to each other, and a withstand voltage of the fifth switch is preferably lower than each of a withstand voltage of the first capacitor and a withstand voltage of the second capacitor. According to this structure, when a voltage substantially equal to the withstand voltage of the fifth switch lower than the withstand voltage of the first capacitor is applied to each of the first capacitor and the fifth switch, the first capacitor does not fail, but the fifth switch fails. When a voltage substantially equal to the withstand voltage of the fifth switch lower than the withstand voltage of the second capacitor is applied to each of the second capacitor and the fifth switch, the second capacitor does not fail, but the fifth switch fails. Consequently, the application of a voltage equal to or more than the withstand voltage of each of the capacitors to each of the capacitors can be significantly reduced or prevented, and the failure of each of the capacitors can be significantly reduced or prevented. Furthermore, the single fifth switch is provided, and hence an increase in the number of components can be significantly reduced or prevented as compared with the case where a device that corresponds to each of the first capacitor and the second capacitor is provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a boost chopper circuit 100 according to a first embodiment of the present invention is now described with reference to FIG. 1.

(Structure of Boost Chopper Circuit)

Figure 1:
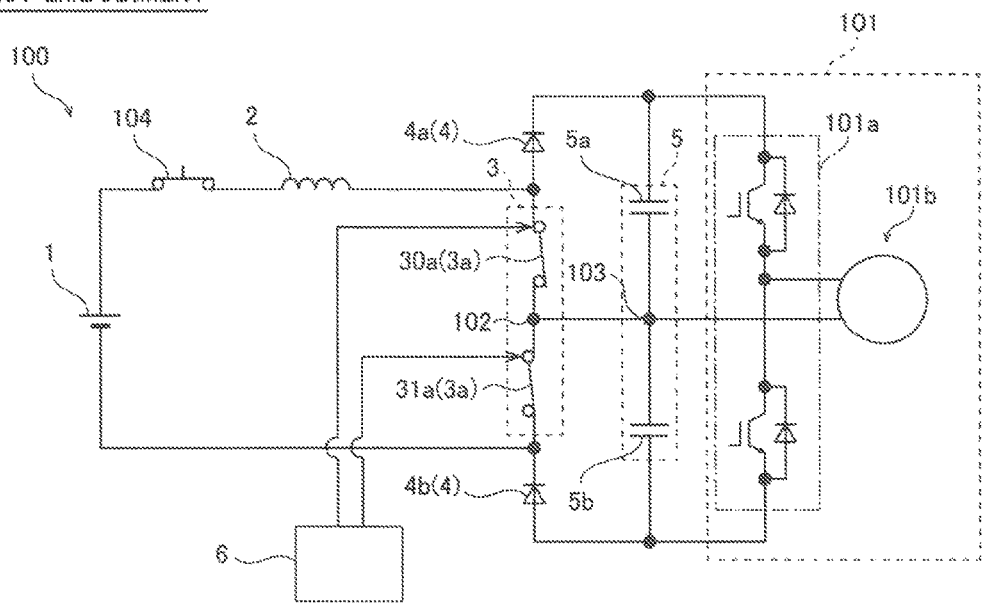
FIG. 1 is a diagram showing the circuit structure of a three-level boost chopper circuit according to a first embodiment of the present invention.

As shown in FIG. 1, the boost chopper circuit 100 is configured to boost a voltage output from a direct-current output circuit 1 and supply the boosted voltage to a loading device 101. According to the first embodiment, the boost chopper circuit 100 is configured as a so-called three-level boost chopper circuit. The direct-current output circuit 1 is configured as a direct-current power supply, or includes an alternating-current power supply and a rectifier circuit and is configured to be capable of outputting a direct current having a rectification waveform obtained by rectifying an alternate current.

The boost chopper circuit 100 includes a reactor 2, a switching device circuit 3, a backflow prevention diode circuit 4, a capacitor circuit 5, and a control circuit 6. In general, the term "circuit" indicates a system of conductors connected to each other without an end, but in this description, the term "circuit" indicates a wider concept including the case where a "path of a current" has an end.

According to the first embodiment, the switching device circuit 3 is connected to opposite ends of the direct-current output circuit 1 through the reactor 2, as shown in FIG. 1. The backflow prevention diode circuit 4 is connected in series to the switching device circuit 3. The capacitor circuit 5 is connected in series to the backflow prevention diode circuit 4 between opposite ends of the switching device circuit 3. Specifically, a first end of the reactor 2 is connected to a positive pole of the direct-current output circuit 1, and a second end of the reactor 2 is connected to a first end of the switching device circuit 3. A second end of the switching device circuit 3 is connected to a negative pole of the direct-current output circuit 1.

The switching device circuit 3 includes a first switching device 3a. The first switching device 3a includes a first switch 30a and a second switch 31a connected in series to the first switch 30a. The backflow prevention diode circuit 4 includes a first backflow prevention diode 4a connected in series to the first switch 30a and a second backflow prevention diode 4b connected in series to the second switch 31a. Specifically, a second end of the first switch 30a opposite to a first end of the first switch 30a connected to the second switch 31a and an anode of the first backflow prevention diode 4a are connected to each other. Each of the second end of the first switch 30a opposite to the first end of the first switch 30a connected to the second switch 31a and the anode of the first backflow prevention diode 4a is connected to the second end of the reactor 2 opposite to the first end of the reactor 2 connected to the positive pole of the direct-current output circuit 1.

A second end of the second switch 31a opposite to a first end of the second switch 31a connected to the first switch 30a and a cathode of the second backflow prevention diode 4b are connected to each other. Each of the second end of the second switch 31a opposite to the first end of the second switch 31a connected to the first switch 30a and the cathode of the second backflow prevention diode 4b is connected to the negative pole of the direct-current output circuit 1.

Each of the first switch 30a and the second switch 31a is configured as a switching device such as a MOSFET, an IGBT (insulated gate bipolar transistor), or a transistor.

The capacitor circuit 5 includes a first capacitor 5a connected in series to the first backflow prevention diode 4a and a second capacitor 5b connected in series to the second backflow prevention diode 4b between the opposite ends of the switching device circuit 3. A first connection 102 that connects the first switch 30a to the second switch 31a and a second connection 103 that connects the first capacitor 5a to the second capacitor 5b are connected to each other. Specifically, a cathode of the first backflow prevention diode 4a and a positive potential side of the first capacitor 5a are connected to each other. An anode of the second backflow prevention diode 4b and a negative potential side of the second capacitor 5b are connected to each other. A negative potential side of the first capacitor 5a and a positive potential side of the second capacitor 5b are connected to each other through the second connection 103.

According to the first embodiment, the withstand voltage of at least one device of the switching device circuit 3 is lower than the withstand voltage of the capacitor circuit 5. Specifically, the withstand voltage of the first switching device 3a of the switching device circuit 3 is lower than the withstand voltage of the capacitor circuit 5. More specifically, the withstand voltage of the first switch 30a is lower than the withstand voltage of the first capacitor 5a. The withstand voltage of the second switch 31a is lower than the withstand voltage of the second capacitor 5b.

The withstand voltage of the capacitor circuit 5 is lower than the withstand voltage of the backflow prevention diode circuit 4. Specifically, the withstand voltage of the first capacitor 5a is lower than the withstand voltage of the first backflow prevention diode 4a. The withstand voltage of the second capacitor 5b is lower than the withstand voltage of the second backflow prevention diode 4b.

According to the first embodiment, at least one device of the switching device circuit 3, the withstand voltage of which is lower than the withstand voltage of the capacitor circuit 5, includes a device constructed of a semiconductor other than a wide band gap semiconductor. Specifically, each of the first switch 30a and the second switch 31a is constructed of the semiconductor (silicon, for example) other than the wide band gap semiconductor.

The backflow prevention diode circuit 4 includes a backflow prevention diode constructed of a wide band gap semiconductor. Specifically, each of the first backflow prevention diode 4a and the second backflow prevention diode 4b is constructed of a semiconductor, the band gap of which is larger (wider) than that of a silicon semiconductor such as SiC, GaN, diamond, AlN, or ZnO. The withstand voltage of the wide band gap semiconductor is higher than that of a semiconductor other than the wide band gap semiconductor. Therefore, the boost chopper circuit 100 can be configured such that a withstand voltage increases in order from the switching device circuit 3, the capacitor circuit 5, and the backflow prevention diode circuit 4.

The control circuit 6 is connected to the first switch 30a and the second switch 31a, and controls a time ratio of turning on and turning off (switching operation) of each of the first switch 30a and the second switch 31a. The control circuit 6 can adjust (control) a voltage value and a current value (the current value of a current that flows through the reactor 2) with respect to the loading device 101 of the boost chopper circuit 100 by controlling the time ratio of turning on and turning off of each of the first switch 30a and the second switch 31a.

The loading device 101 includes an inverter 101a including a plurality of switching devices and an electric motor 101b, for example. The inverter 101a is connected to opposite ends of the capacitor circuit 5, and is configured to convert direct-current power with a voltage boosted by the boost chopper circuit 100 to alternating-current power and supply the alternating-current power to the electric motor 101b. The electric motor 101b is configured as a rotating electrical machine, for example, and is configured to consume the alternating-current power from the inverter 101a to be rotationally driven.

(Operation of Boost Chopper Circuit)

The operation of the boost chopper circuit 100 according to the first embodiment is now described with reference to FIG. 1. The operation of the boost chopper circuit 100 is performed by control processing of the control circuit 6.

When the first switch 30a is turned on and the second switch 31a is turned off, a series resonant circuit of the direct-current output circuit 1, the reactor 2, and the second capacitor 5b is formed, and the voltage of the second capacitor 5b rises. In this case, the voltage of the second capacitor 5b is applied to the second switch 31a. The second backflow prevention diode 4b conducts, and no voltage is applied thereto. The voltage of the first capacitor 5a into which no current flows from the direct-current output circuit 1 is applied to the first backflow prevention diode 4a.

When the first switch 30a is turned off and the second switch 31a is turned on, the direct-current output circuit 1 charges the first capacitor 5a, and the voltage of the first capacitor 5a is applied to the first switch 30a, which is off.

When both the first switch 30a and the second switch 31a are turned on, the direct-current output circuit 1 is short-circuited through the reactor 2, and no current flows from the direct-current output circuit 1 into the first capacitor 5a and the second capacitor 5b. The voltages of the first capacitor 5a and the second capacitor 5b are applied to the first backflow prevention diode 4a and the second backflow prevention diode 4b, respectively. A current flows from the first capacitor 5a and the second capacitor 5b to the subsequent loading device 101 (in FIG. 1, the loading device 101 is illustrated as a half-bridge single-phase inverter, but it is not restricted to this) so that the voltages of the first capacitor 5a and the second capacitor 5b drop.

When both the first switch 30a and the second switch 31a are turned off, the first capacitor 5a and the second capacitor 5b are charged by current from the direct-current output circuit 1. The voltages of the first capacitor 5a and the second capacitor 5b are applied to the first switch 30a and the second switch 31a, respectively.

During steady operation, each of the first switch 30a and the second switch 31a is switched on and off at a fixed time ratio, the amount of rise in the voltages of the first capacitor 5a and the second capacitor 5b in the case where the first switch 30a and the second switch 31a are switched off balances the amount of drop in the voltages of the first capacitor 5a and the second capacitor 5b in the case where the first switch 30a and the second switch 31a are switched on, and a substantially constant direct-current voltage is obtained.

When the device (loading device 101) stops, both the first switch 30a and the second switch 31a are turned off. Furthermore, the subsequent loading device 101 (switches of the inverter) is also turned off, and no current flows to the loading device 101. In this case, the direct-current output circuit 1, the reactor 2, the first capacitor 5a, and the second capacitor 5b form a series resonant circuit, and the voltages of the first capacitor 5a and the second capacitor 5b rise. Both the first switch 30a and the second switch 31a are not turned on (in an off-state), and hence the voltages of the first capacitor 5a and the second capacitor 5b are raised above those during steady operation. In this case, the withstand voltages of the first capacitor 5a and the second capacitor 5b are higher than the raised voltages.

When a resonant current reaches zero, the discharge of the first capacitor 5a and the second capacitor 5b is prevented by the first backflow prevention diode 4a, the second backflow prevention diode 4b, and the first switch 30a and the second switch 31a, which are off. Whereas the voltages of the first switch 30a and the second switch 31a are equal to the voltage of the first capacitor 5a or the second capacitor 5b during the time when the capacitor circuit 5 is charged, the voltages of the first switch 30a and the second switch 31a become equal to a half of the voltage of the direct-current output circuit 1 when the resonant current reaches zero. Although the first backflow prevention diode 4a and the second backflow prevention diode 4b have no voltage during the time when the first capacitor 5a and the second capacitor 5b are charged (the potential difference is substantially zero), a voltage obtained by subtracting the voltages of the first switch 30a and the second switch 31a (a half of the voltage of the direct-current output circuit 1) from the voltages of the first capacitor 5a and the second capacitor 5b is applied to the first backflow prevention diode 4a and the second backflow prevention diode 4b when the resonant current reaches zero.

In the boost chopper circuit 100 that performs the above operation, one (first switch 30a, for example) of the first switch 30a and the second switch 31a can have a short-circuit fault. In this case, the inverter 101a is disconnected such that the loading device 101 is separate from the boost chopper circuit 100, and the second switch 31a is controlled to be disconnected. The first switch 30a has a short-circuit fault, whereby a series resonant current flows from the direct-current output circuit 1 to the second capacitor 5b through the reactor 2 and the short-circuited first switch 30a. Furthermore, the first switch 30a has a short-circuit fault, and hence the series resonant current that flows to the second capacitor 5b is uncontrollable. Thus, the voltage of the second capacitor 5b may become higher than the voltage of the direct-current output circuit 1. A voltage substantially equal to the voltage of the second capacitor 5b is applied to the second switch 31a. The withstand voltage of the second switch 31a is lower than the withstand voltage of the second capacitor 5b, and hence when the voltage to be applied to the second switch 31a becomes substantially equal to the withstand voltage of the second switch 31a, the second capacitor 5b does not fail, but the second switch 31a fails. Consequently, a series resonant current flows from the direct-current output circuit 1 through the reactor 2, the short-circuited first switch 30a, and the short-circuited second switch 31a. After this state is obtained, a current breaker 104 (fuse, for example) breaks electrical connection between the direct-current output circuit 1 and the reactor 2. Also when the second switch 31a has a short-circuit fault, a series resonant current flows from the direct-current output circuit 1 through the reactor 2, the short-circuited first switch 30a, and the short-circuited second switch 31a.

Effects of First Embodiment

According to the first embodiment, the following effects can be obtained.

According to the first embodiment, as hereinabove described, the boost chopper circuit 100 includes the reactor 2, the switching device circuit 3 connected to the opposite ends of the direct-current output circuit 1 through the reactor 2, the backflow prevention diode circuit 4 connected in series to the switching device circuit 3, and the capacitor circuit 5 connected in series to the backflow prevention diode circuit 4 between the opposite ends of the switching device circuit 3, and the withstand voltage of at least one device of the switching device circuit 3 is lower than the withstand voltage of the capacitor circuit 5. Thus, when a voltage substantially equal to the withstand voltage of the device of the switching device circuit 3 lower than the withstand voltage of the capacitor circuit 5 is applied to the capacitor circuit 5 and each device of the switching device circuit 3, the capacitor circuit 5 does not fail, but the device of the switching device circuit 3 fails. Consequently, the failing device of the switching device circuit 3 is short-circuited such that a series resonant current flows through the short-circuited device of the switching device circuit 3 but not through the capacitor circuit 5. Thus, the application of a voltage equal to or more than the withstand voltage of the capacitor circuit 5 to the capacitor circuit 5 can be significantly reduced or prevented, and the failure of the capacitor circuit 5 can be significantly reduced or prevented.

According to the first embodiment, as hereinabove described, the withstand voltage of the capacitor circuit 5 is lower than the withstand voltage of the backflow prevention diode circuit 4. Thus, when one device of the switching device circuit 3 fails and the voltage of the capacitor circuit 5 is applied to the backflow prevention diode circuit 4, the failure of the backflow prevention diode circuit 4 can be significantly reduced or prevented. Consequently, the short circuit discharge of the capacitor circuit 5 is significantly reduced or prevented.

According to the first embodiment, as hereinabove described, at least one device of the switching device circuit 3, the withstand voltage of which is lower than the withstand voltage of the capacitor circuit 5, includes the device constructed of the semiconductor other than the wide band gap semiconductor. In general, the withstand voltage of the semiconductor other than the wide band gap semiconductor is lower than the withstand voltage of the wide band gap semiconductor. Therefore, as compared with the case where the device of the switching device circuit 3 is constructed of the wide band gap semiconductor, at least one device of the switching device circuit 3 fails at the lowest applied voltage, and hence a series resonant current can flow through the short-circuited device of the switching device circuit 3, and the failure of the capacitor circuit 5 can be relatively easily and significantly reduced or prevented. Furthermore, the semiconductor other than the wide band gap semiconductor is generally less expensive than the wide band gap semiconductor, and hence the repair costs of the failing switching device circuit 3 can be reduced.

According to the first embodiment, as hereinabove described, the switching device circuit 3 includes the first switching device 3a, and the withstand voltage of the first switching device 3a is lower than the withstand voltage of the capacitor circuit 5. Thus, when a voltage substantially equal to the withstand voltage of the first switching device 3a lower than the withstand voltage of the capacitor circuit 5 is applied to each of the capacitor circuit 5 and the first switching device 3a, the capacitor circuit 5 does not fail, but the first switching device 3a fails. Consequently, a series resonant current flows through the short-circuited first switching device 3a but not through the capacitor circuit 5. Thus, the application of a voltage equal to or more than the withstand voltage of the capacitor circuit 5 to the capacitor circuit 5 can be significantly reduced or prevented, and the failure of the capacitor circuit 5 can be significantly reduced or prevented.

According to the first embodiment, as hereinabove described, the backflow prevention diode circuit 4 includes the backflow prevention diode constructed of the wide band gap semiconductor, and the first switching device 3a includes the switching device constructed of the semiconductor other than the wide band gap semiconductor. Thus, when the first switching device 3a fails and the voltage of the capacitor circuit 5 is applied to the backflow prevention diode circuit 4, the failure of the backflow prevention diode circuit 4 can be significantly reduced or prevented.

According to the first embodiment, as hereinabove described, the first switching device 3a includes the first switch 30a and the second switch 31a connected in series to the first switch 30a, the backflow prevention diode circuit 4 includes the first backflow prevention diode 4a connected in series to the first switch 30a and the second backflow prevention diode 4b connected in series to the second switch 31a, the capacitor circuit 5 includes the first capacitor 5a connected in series to the first backflow prevention diode 4a and the second capacitor 5b connected in series to the second backflow prevention diode 4b between the opposite ends of the switching device circuit 3, the first connection 102 that connects the first switch 30a to the second switch 31a and the second connection 103 that connects the first capacitor 5a to the second capacitor 5b are connected to each other, and the withstand voltage of the first switch 30a is lower than the withstand voltage of the first capacitor 5a while the withstand voltage of the second switch 31a is lower than the withstand voltage of the second capacitor 5b. Thus, when a voltage substantially equal to the withstand voltage of the first switch 30a lower than the withstand voltage of the first capacitor 5a is applied to each of the first capacitor 5a and the first switch 30a, the first capacitor 5a does not fail, but the first switch 30a fails. When a voltage substantially equal to the withstand voltage of the second switch 31a lower than the withstand voltage of the second capacitor 5b is applied to each of the second capacitor 5b and the second switch 31a, the second capacitor 5b does not fail, but the second switch 31a fails. Consequently, the application of a voltage equal to or more than the withstand voltage of each of the capacitors to each of the capacitors can be significantly reduced or prevented, and the failure of each of the capacitors can be significantly reduced or prevented.

Second Embodiment

Figure 2:
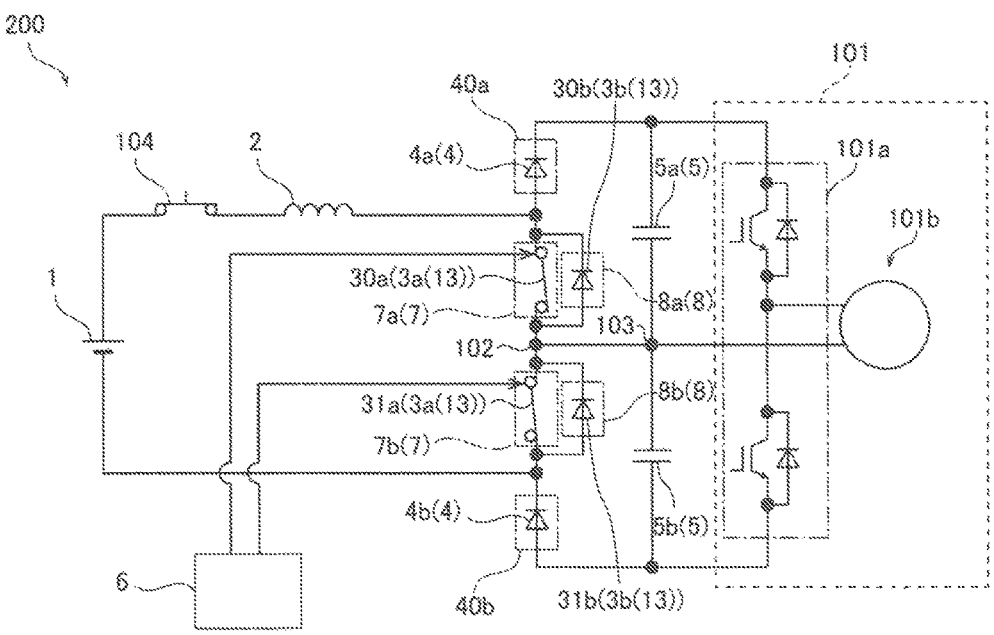
FIG. 2 is a diagram showing the circuit structure of a three-level boost chopper circuit according to a second embodiment of the present invention.

The structure of a boost chopper circuit 200 according to a second embodiment is now described with reference to FIG. 2. According to the second embodiment, the boost chopper circuit 200 is configured as a three-level boost chopper circuit similarly to the first embodiment. On the other hand, according to the second embodiment, the boost chopper circuit 200 includes an antiparallel diode element 3b connected in anti-parallel to a first switching device 3a. Portions of the boost chopper circuit 200 similar to those of the boost chopper circuit 100 according to the aforementioned first embodiment are denoted by the same reference numerals, to omit the description.

(Structure of Boost Chopper Circuit)

According to the second embodiment, a switching device circuit 13 includes the antiparallel diode element 3b connected in anti-parallel to the first switching device 3a. Specifically, the antiparallel diode element 3b includes a first antiparallel diode 30b connected in anti-parallel to a first switch 30a and a second antiparallel diode 31b connected in anti-parallel to a second switch 31a. More specifically, a cathode of the first antiparallel diode 30b is connected to an anode of a first backflow prevention diode 4a. An anode of the first antiparallel diode 30b is connected to a second end of the first switch 30a opposite to a first end of the first switch 30a connected to the anode of the first backflow prevention diode 4a. A cathode of the second antiparallel diode 31b is connected to a first end of the second switch 31a connected to the first switch 30a. An anode of the second antiparallel diode 31b is connected to a cathode of a second backflow prevention diode 4b.

According to the second embodiment, the withstand voltage of the antiparallel diode element 3b is lower than the withstand voltage of a capacitor circuit 5. Specifically, the withstand voltage of the first antiparallel diode 30b is lower than the withstand voltage of a first capacitor 5a. The withstand voltage of the second antiparallel diode 31b is lower than the withstand voltage of a second capacitor 5b. Similarly to the first embodiment, the boost chopper circuit 200 is configured such that a withstand voltage increases in order from the switching device circuit 13, the capacitor circuit 5, and a backflow prevention diode circuit 4.

According to the second embodiment, the first switching device 3a includes a switching device constructed of a wide band gap semiconductor. The antiparallel diode element 3b includes an antiparallel diode constructed of a semiconductor other than a wide band gap semiconductor. Specifically, each of the first switch 30a and the second switch 31a is constructed of the wide band gap semiconductor. Each of the first antiparallel diode 30b and the second antiparallel diode 31b is constructed of the semiconductor other than the wide band gap semiconductor. The withstand voltage of the first antiparallel diode 30b is lower than the withstand voltage of the first switch 30a. The withstand voltage of the second antiparallel diode 31b is lower than the withstand voltage of the second switch 31a.

When the first switch 30a has a short-circuit fault, a voltage substantially equal to the voltage of the second capacitor 5b is applied to each of the second switch 31a and the second antiparallel diode 31b. The withstand voltage of the second antiparallel diode 31b is lower than each of the withstand voltage of the second switch 31a and the withstand voltage of the second capacitor 5b, and hence the second antiparallel diode 31b fails before the second switch 31a or the second capacitor 5b fails. Consequently, a series resonant current flows from a direct-current output circuit 1 through a reactor 2, the short-circuited first switch 30a, and the short-circuited second antiparallel diode 31b. After this state is obtained, a current breaker 104 breaks electrical connection between the direct-current output circuit 1 and the reactor 2. When the second switch 31a has a short-circuit fault, a series resonant current flows from the direct-current output circuit 1 through the reactor 2, the short-circuited first antiparallel diode 30b, and the short-circuited second switch 31a.

The boost chopper circuit 200 includes a first semiconductor package 7 that houses each of the first switch 30a and the second switch 31a. The boost chopper circuit 200 includes a second semiconductor package 8 that is provided separately from the first semiconductor package 7 and houses each of the first antiparallel diode 30b and the second antiparallel diode 31b. Specifically, the first semiconductor package 7 includes a first switch package 7a that houses the first switch 30a and a second switch package 7b that houses the second switch 31a. The second semiconductor package 8 includes a first antiparallel diode package 8a that houses the first antiparallel diode 30b and a second antiparallel diode package 8b that houses the second antiparallel diode 31b. The first backflow prevention diode 4a is housed in a first backflow prevention diode package 40a. The second backflow prevention diode 4b is housed in a second backflow prevention diode package 40b. The first switch package 7a, the second switch package 7b, the first antiparallel diode package 8a, the second antiparallel diode package 8b, the first backflow prevention diode package 40a, and the second backflow prevention diode package 40b are replaceable individually.

The remaining structures of the boost chopper circuit 200 according to the second embodiment are similar to those of the boost chopper circuit 100 according to the aforementioned first embodiment.

Effects of Second Embodiment

According to the second embodiment, the following effects can be obtained.

According to the second embodiment, as hereinabove described, the switching device circuit 13 includes the first switching device 3a and the antiparallel diode element 3b connected in anti-parallel to the first switching device 3a, and the withstand voltage of the antiparallel diode element 3b is lower than the withstand voltage of the capacitor circuit 5. Thus, when a voltage substantially equal to the withstand voltage of the antiparallel diode element 3b lower than the withstand voltage of the capacitor circuit 5 is applied to each of the capacitor circuit 5 and the antiparallel diode element 3b, the capacitor circuit 5 does not fail, but the antiparallel diode element 3b fails. Consequently, a series resonant current flows through the short-circuited antiparallel diode element 3b but not through the capacitor circuit 5. Thus, the application of a voltage equal to or more than the withstand voltage of the capacitor circuit 5 to the capacitor circuit 5 can be easily significantly reduced or prevented, and the failure of the capacitor circuit 5 can be easily significantly reduced or prevented.

According to the second embodiment, as hereinabove described, the first switching device 3a includes the switching device constructed of the wide band gap semiconductor, and the antiparallel diode element 3b includes the antiparallel diode constructed of the semiconductor other than the wide band gap semiconductor. Thus, the switching device constructed of the wide band gap semiconductor is used for the first switching device 3a that conducts during normal operation, whereby a switching loss can be reduced as compared with the case where a switching device constructed of a common silicon semiconductor is used. Consequently, an electric power loss can be reduced when the boost chopper circuit 200 is driven.

According to the second embodiment, as hereinabove described, the first switching device 3a includes the first switch 30a and the second switch 31a connected in series to the first switch 30a, the backflow prevention diode circuit 4 includes the first backflow prevention diode 4a connected in series to the first switch 30a and the second backflow prevention diode 4b connected in series to the second switch 31a, the capacitor circuit 5 includes the first capacitor 5a connected in series to the first backflow prevention diode 4a and the second capacitor 5b connected in series to the second backflow prevention diode 4b between opposite ends of the switching device circuit 13, the antiparallel diode element 3b includes the first antiparallel diode 30b connected in anti-parallel to the first switch 30a and the second antiparallel diode 31b connected in anti-parallel to the second switch 31a, the first connection 102 that connects the first switch 30a to the second switch 31a and the second connection 103 that connects the first capacitor 5a to the second capacitor 5b are connected to each other, and the withstand voltage of the first antiparallel diode 30b is lower than the withstand voltage of the first capacitor 5a while the withstand voltage of the second antiparallel diode 31b is lower than the withstand voltage of the second capacitor 5b.

Thus, when a voltage substantially equal to the withstand voltage of the first antiparallel diode 30b lower than the withstand voltage of the first capacitor 5a is applied to each of the first capacitor 5a and the first antiparallel diode 30b, the first capacitor 5a does not fail, but the first antiparallel diode 30b fails. When a voltage substantially equal to the withstand voltage of the second antiparallel diode 31b lower than the withstand voltage of the second capacitor 5b is applied to each of the second capacitor 5b and the second antiparallel diode 31b, the second capacitor 5b does not fail, but the second antiparallel diode 31b fails. Consequently, the application of a voltage equal to or more than the withstand voltage of each of the capacitors to each of the capacitors can be easily significantly reduced or prevented, and the failure of each of the capacitors can be easily significantly reduced or prevented.

According to the second embodiment, as hereinabove described, each of the first backflow prevention diode 4a and the second backflow prevention diode 4b is constructed of a wide band gap semiconductor, and each of the first antiparallel diode 30b and the second antiparallel diode 31b is constructed of the semiconductor other than the wide band gap semiconductor. Thus, when the first antiparallel diode 30b fails and the voltage of the first capacitor 5a is applied to the first backflow prevention diode 4a, the failure of the first backflow prevention diode 4a can be significantly reduced or prevented. When the second antiparallel diode 31b fails and the voltage of the second capacitor 5b is applied to the second backflow prevention diode 4b, the failure of the second backflow prevention diode 4b can be significantly reduced or prevented.

According to the second embodiment, as hereinabove described, the boost chopper circuit 200 further includes the first semiconductor package 7 that houses each of the first switch 30a and the second switch 31a and the second semiconductor package 8 that is provided separately from the first semiconductor package 7 and houses each of the first antiparallel diode 30b and the second antiparallel diode 31b. Thus, when either the first switch 30a or the first antiparallel diode 30b fails, only the first semiconductor package 7 that houses the failing first switch 30a or only the second semiconductor package 8 that houses the failing first antiparallel diode 30b can be replaced, and hence the replacement of the first switch 30a or the first antiparallel diode 30b that requires no replacement can be prevented. Similarly to the relationship between the first switch 30a and the first antiparallel diode 30b, when either the second switch 31a or the second antiparallel diode 31b fails, the replacement of the second switch 31a or the second antiparallel diode 31b that requires no replacement can be prevented. In this case, the replacement of the first switch 30a, the second switch 31a, the first antiparallel diode 30b, or the second antiparallel diode 31b that requires no replacement is prevented, and hence an increase in replacement costs can be prevented. Furthermore, the semiconductor other than the wide band gap semiconductor is generally less expensive than the wide band gap semiconductor. Therefore, each of the first antiparallel diode 30b and the second antiparallel diode 31b is constructed of the semiconductor other than the wide band gap semiconductor, whereby the boost chopper circuit can be inexpensively manufactured. When the second semiconductor package 8 that houses each of the first antiparallel diode 30b and the second antiparallel diode 31b constructed of the semiconductor other than the wide band gap semiconductor is replaced, the replacement costs can be reduced.

The remaining effects of the boost chopper circuit 200 according to the second embodiment are similar to those of the boost chopper circuit 100 according to the aforementioned first embodiment.

Third Embodiment

Figure 3:
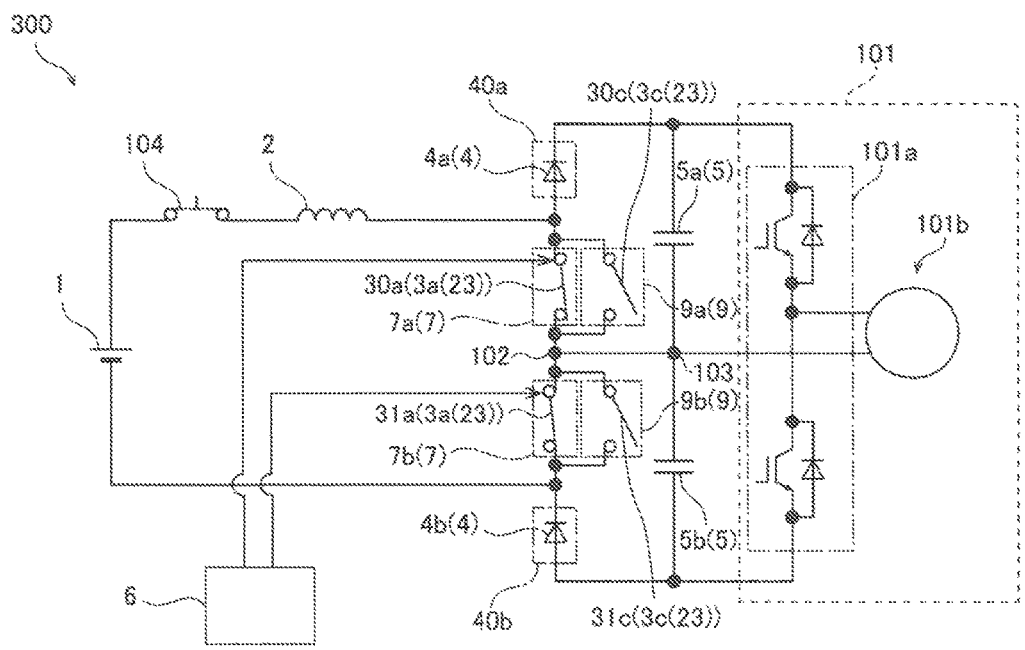
FIG. 3 is a diagram showing the circuit structure of a three-level boost chopper circuit according to a third embodiment of the present invention.

The structure of a boost chopper circuit 300 according to a third embodiment is now described with reference to FIG. 3. According to the third embodiment, the boost chopper circuit 300 is configured as a three-level boost chopper circuit similarly to the first embodiment and the second embodiment. On the other hand, according to the third embodiment, the boost chopper circuit 300 includes a second switching device 3c connected in parallel to a first switching device 3a unlike the second embodiment in which the boost chopper circuit 200 includes the antiparallel diode element 3b connected in anti-parallel to the first switching device 3a. Portions of the boost chopper circuit 300 similar to those of the boost chopper circuit 200 according to the aforementioned second embodiment are denoted by the same reference numerals, to omit the description.

(Structure of Boost Chopper Circuit)

According to the third embodiment, a switching device circuit 23 includes the first switching device 3a and the second switching device 3c connected in parallel to the first switching device 3a. Specifically, the second switching device 3c includes a third switch 30c connected in parallel to a first switch 30a and a fourth switch 31c connected in parallel to a second switch 31a. More specifically, a first end of the third switch 30c is connected to an anode of a first backflow prevention diode 4a. A second end of the third switch 30c is connected to a second end of the first switch 30a opposite to a first end of the first switch 30a connected to the anode of the first backflow prevention diode 4a. A first end of the fourth switch 31c is connected to a first end of the second switch 31a connected to the first switch 30a. A second end of the fourth switch 31c is connected to a cathode of a second backflow prevention diode 4b.

According to the third embodiment, the withstand voltage of the second switching device 3c is lower than the withstand voltage of the first switching device 3a and the withstand voltage of a capacitor circuit 5. Specifically, the withstand voltage of the third switch 30c is lower than the withstand voltage of the first switch 30a and the withstand voltage of a first capacitor 5a. The withstand voltage of the fourth switch 31c is lower than the withstand voltage of the second switch 31a and the withstand voltage of a second capacitor 5b. Similarly to the first embodiment, the boost chopper circuit 300 is configured such that a withstand voltage increases in order from the switching device circuit 23, the capacitor circuit 5, and a backflow prevention diode circuit 4.

The second switching device 3c includes a switching device constructed of a semiconductor other than a wide band gap semiconductor. Specifically, each of the third switch 30c and the fourth switch 31c is constructed of the semiconductor other than the wide band gap semiconductor. The withstand voltage of the third switch 30c is lower than the withstand voltage of the first switch 30a. The withstand voltage of the fourth switch 31c is lower than the withstand voltage of the second switch 31a.

When the first switch 30a has a short-circuit fault, a voltage substantially equal to the voltage of the second capacitor 5b is applied to each of the second switch 31a and the fourth switch 31c. The withstand voltage of the fourth switch 31c is lower than each of the withstand voltage of the second switch 31a and the withstand voltage of the second capacitor 5b, and hence the fourth switch 31c fails before the second switch 31a or the second capacitor 5b fails. Consequently, a series resonant current flows from a direct-current output circuit 1 through a reactor 2, the short-circuited first switch 30a, and the short-circuited fourth switch 31c. After this state is obtained, a current breaker 104 breaks electrical connection between the direct-current output circuit 1 and the reactor 2. When the second switch 31a has a short-circuit fault, a series resonant current flows from the direct-current output circuit 1 through the reactor 2, the short-circuited third switch 30c, and the short-circuited second switch 31a.

The boost chopper circuit 300 includes a third semiconductor package 9 that is provided separately from a first semiconductor package 7 and houses each of the third switch 30c and the fourth switch 31c. Specifically, the third semiconductor package 9 includes a third switch package 9a that houses the third switch 30c and a fourth switch package 9b that houses the fourth switch 31c. A first switch package 7a, a second switch package 7b, the third switch package 9a, the fourth switch package 9b, a first backflow prevention diode package 40a, and a second backflow prevention diode package 40b are replaceable individually.

The remaining structures of the boost chopper circuit 300 according to the third embodiment are similar to those of the boost chopper circuit 200 according to the aforementioned second embodiment.

Effects of Third Embodiment

According to the third embodiment, the following effects can be obtained.

According to the third embodiment, as hereinabove described, the switching device circuit 23 includes the first switching device 3a and the second switching device 3c connected in parallel to the first switching device 3a, and the withstand voltage of the second switching device 3c is lower than the withstand voltage of the first switching device 3a and the withstand voltage of the capacitor circuit 5. Thus, when a voltage substantially equal to the withstand voltage of the second switching device 3c lower than the withstand voltage of the capacitor circuit 5 is applied to each of the capacitor circuit 5 and the second switching device 3c, the capacitor circuit 5 does not fail, but the second switching device 3c fails. Consequently, a series resonant current flows through the short-circuited second switching device 3c but not through the capacitor circuit 5. Thus, the application of a voltage equal to or more than the withstand voltage of the capacitor circuit 5 to the capacitor circuit 5 can be easily significantly reduced or prevented, and the failure of the capacitor circuit 5 can be easily significantly reduced or prevented.

According to the third embodiment, as hereinabove described, the first switching device 3a includes the switching device constructed of a wide band gap semiconductor, and the second switching device 3c includes the switching device constructed of the semiconductor other than the wide band gap semiconductor. Thus, the semiconductor other than the wide band gap semiconductor is used for the second switching device 3c that does not conduct during normal operation, whereby the withstand voltage of the second switching device 3c can be easily lowered.

According to the third embodiment, as hereinabove described, the first switching device 3a includes the first switch 30a and the second switch 31a connected in series to the first switch 30a, the backflow prevention diode circuit 4 includes the first backflow prevention diode 4a connected in series to the first switch 30a and the second backflow prevention diode 4b connected in series to the second switch 31a, the capacitor circuit 5 includes the first capacitor 5a connected in series to the first backflow prevention diode 4a and the second capacitor 5b connected in series to the second backflow prevention diode 4b between opposite ends of the switching device circuit 23, the second switching device 3c includes the third switch 30c connected in parallel to the first switch 30a and the fourth switch 31c connected in parallel to the second switch 31a, a first connection 102 that connects the first switch 30a to the second switch 31a and a second connection 103 that connects the first capacitor 5a to the second capacitor 5b are connected to each other, and the withstand voltage of the third switch 30c is lower than the withstand voltage of the first capacitor 5a while the withstand voltage of the fourth switch 31c is lower than the withstand voltage of the second capacitor 5b.

Thus, when a voltage substantially equal to the withstand voltage of the third switch 30c lower than the withstand voltage of the first capacitor 5a is applied to each of the first capacitor 5a and the third switch 30c, the first capacitor 5a does not fail, but the third switch 30c fails. When a voltage substantially equal to the withstand voltage of the fourth switch 31c lower than the withstand voltage of the second capacitor 5b is applied to each of the second capacitor 5b and the fourth switch 31c, the second capacitor 5b does not fail, but the fourth switch 31c fails. Consequently, the application of a voltage equal to or more than the withstand voltage of each of the capacitors to each of the capacitors can be easily significantly reduced or prevented, and the failure of each of the capacitors can be easily significantly reduced or prevented.

According to the third embodiment, as hereinabove described, each of the first backflow prevention diode 4a and the second backflow prevention diode 4b is constructed of a wide band gap semiconductor, and each of the third switch 30c and the fourth switch 31c is constructed of the semiconductor other than the wide band gap semiconductor. Thus, when the third switch 30c fails and the voltage of the first capacitor 5a is applied to the first backflow prevention diode 4a, the failure of the first backflow prevention diode 4a can be easily significantly reduced or prevented. When the fourth switch 31c fails and the voltage of the second capacitor 5b is applied to the second backflow prevention diode 4b, the failure of the second backflow prevention diode 4b can be easily significantly reduced or prevented.

According to the third embodiment, as hereinabove described, the boost chopper circuit 300 further includes the first semiconductor package 7 that houses each of the first switch 30a and the second switch 31a and the third semiconductor package 9 that is provided separately from the first semiconductor package 7 and houses each of the third switch 30c and the fourth switch 31c. Thus, when either the first switch 30a or the third switch 30c fails, only the first semiconductor package 7 that houses the failing first switch 30a or only the third semiconductor package 9 that houses the failing third switch 30c can be replaced, and hence the replacement of the first switch 30a or the third switch 30c that requires no replacement can be prevented. Similarly to the relationship between the first switch 30a and the third switch 30c, when either the second switch 31a or the fourth switch 31c fails, the replacement of the second switch 31a or the fourth switch 31c that requires no replacement can be prevented.

The remaining effects of the boost chopper circuit 300 according to the third embodiment are similar to those of the boost chopper circuit 100 according to the aforementioned first embodiment.

Fourth Embodiment

Figure 4:
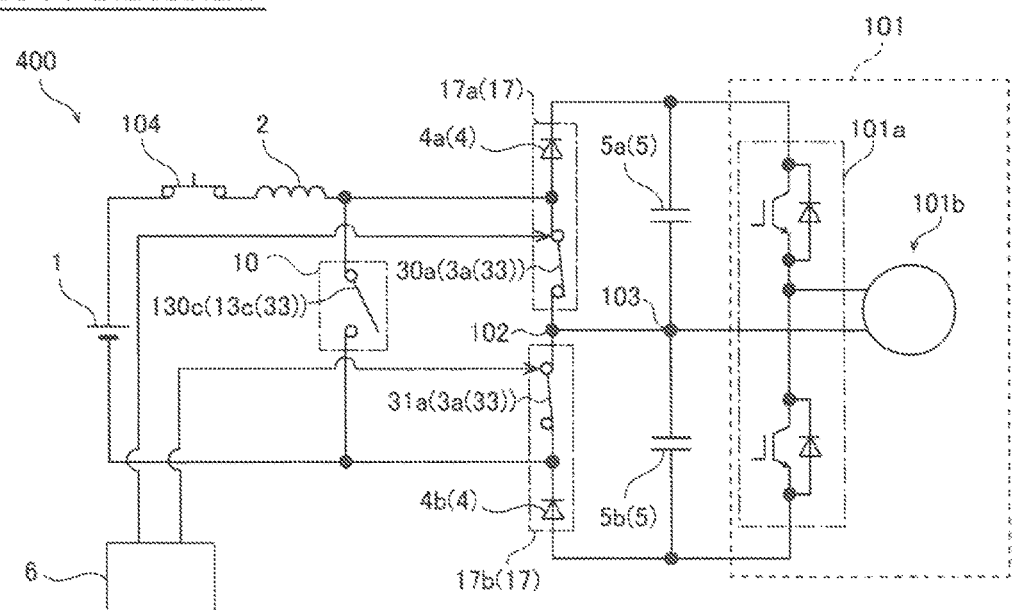
FIG. 4 is a diagram showing the circuit structure of a three-level boost chopper circuit according to a fourth embodiment of the present invention.

The structure of a boost chopper circuit 400 according to a fourth embodiment is now described with reference to FIG. 4. According to the fourth embodiment, the boost chopper circuit 400 is configured as a three-level boost chopper circuit similarly to the first, second, and third embodiments. On the other hand, according to the fourth embodiment, a second switching device 13c includes only a single fifth switch 130c unlike the third embodiment in which the second switching device 3c includes the third switch 30c and the fourth switch 31c. Portions of the boost chopper circuit 400 similar to those of the boost chopper circuit 300 according to the aforementioned third embodiment are denoted by the same reference numerals, to omit the description.

(Structure of Boost Chopper Circuit)

According to the fourth embodiment, the second switching device 13c includes the single fifth switch 130c connected in parallel to a first switching device 3a. Specifically, the fifth switch 130c is connected in parallel to both a first switch 30a and a second switch 31a. A first end of the fifth switch 130c is connected to an anode of a first backflow prevention diode 4a. A second end of the fifth switch 130c is connected to a cathode of a second backflow prevention diode 4b.

The fifth switch 130c is constructed of a semiconductor other than a wide band gap semiconductor. The withstand voltage of the fifth switch 130c is lower than each of the withstand voltage of the first switch 30a, the withstand voltage of the second switch 31a, the withstand voltage of the first backflow prevention diode 4a, and the withstand voltage of the second backflow prevention diode 4b. Similarly to the first embodiment, the boost chopper circuit 400 is configured such that a withstand voltage increases in order from a switching device circuit 33, a capacitor circuit 5, and a backflow prevention diode circuit 4.

When the first switch 30a has a short-circuit fault, a voltage substantially equal to the voltage of a second capacitor 5b is applied to each of the second switch 31a and the fifth switch 130c. The withstand voltage of the fifth switch 130c is lower than each of the withstand voltage of the second switch 31a and the withstand voltage of the second capacitor 5b, and hence the fifth switch 130c fails before the second switch 31a or the second capacitor 5b fails. Consequently, a series resonant current flows from a direct-current output circuit 1 through a reactor 2 and the short-circuited fifth switch 130c. After this state is obtained, a current breaker 104 breaks electrical connection between the direct-current output circuit 1 and the reactor 2. Also when the second switch 31a has a short-circuit fault, a series resonant current flows from the direct-current output circuit 1 through the reactor 2 and the short-circuited fifth switch 130c.

The first backflow prevention diode 4a is housed in a first switch package 17a of a first semiconductor package 17 the houses the first switch 30a. The second backflow prevention diode 4b is housed in a second switch package 17b of the first semiconductor package 17 the houses the second switch 31a.

The boost chopper circuit 400 includes a fourth semiconductor package 10 that is provided separately from the first semiconductor package 17 and houses the fifth switch 130c. The first switch package 17a, the second switch package 17b, and the fourth semiconductor package 10 are replaceable individually.

The remaining structures of the boost chopper circuit 400 according to the fourth embodiment are similar to those of the boost chopper circuit 300 according to the aforementioned third embodiment.

Effects of Fourth Embodiment

According to the fourth embodiment, the following effects can be obtained.

According to the fourth embodiment, as hereinabove described, the first switching device 3a includes the first switch 30a and the second switch 31a connected in series to the first switch 30a, the backflow prevention diode circuit 4 includes the first backflow prevention diode 4a connected in series to the first switch 30a and the second backflow prevention diode 4b connected in series to the second switch 31a, the capacitor circuit 5 includes a first capacitor 5a connected in series to the first backflow prevention diode 4a and the second capacitor 5b connected in series to the second backflow prevention diode 4b between opposite ends of the switching device circuit 33, the second switching device 13c includes the single fifth switch 130c connected in parallel to the first switching device 3a, a first connection 102 that connects the first switch 30a to the second switch 31a and a second connection 103 that connects the first capacitor 5a to the second capacitor 5b are connected to each other, and the withstand voltage of the fifth switch 130c is lower than each of the withstand voltage of the first capacitor 5a and the withstand voltage of the second capacitor 5b.

Thus, when a voltage substantially equal to the withstand voltage of the fifth switch 130c lower than the withstand voltage of the first capacitor 5a is applied to each of the first capacitor 5a, the first switch 30a, and the fifth switch 130c, the first capacitor 5a does not fail, but the fifth switch 130c fails. When a voltage substantially equal to the withstand voltage of the fifth switch 130c lower than the withstand voltage of the second capacitor 5b is applied to each of the second capacitor 5b, the second switch 31a, and the fifth switch 130c, the second capacitor 5b does not fail, but the fifth switch 130c fails. Consequently, the application of a voltage equal to or more than the withstand voltage of each of the capacitors to each of the capacitors can be significantly reduced or prevented, and the failure of each of the capacitors can be significantly reduced or prevented. Furthermore, the single fifth switch 130c is provided, and hence an increase in the number of components can be significantly reduced or prevented as compared with the case where a device that corresponds to each of the first capacitor 5a and the second capacitor 5b is provided.

According to the fourth embodiment, as hereinabove described, each of the first backflow prevention diode 4a and the second backflow prevention diode 4b is constructed of a wide band gap semiconductor, and the fifth switch 130c is constructed of the semiconductor other than the wide band gap semiconductor. Thus, when the fifth switch 130c fails and the voltage of the first capacitor 5a is applied to the first backflow prevention diode 4a, the failure of the first backflow prevention diode 4a can be more easily and significantly reduced or prevented. When the fifth switch 130c fails and the voltage of the second capacitor 5b is applied to the second backflow prevention diode 4b, the failure of the second backflow prevention diode 4b can be easily significantly reduced or prevented.

According to the fourth embodiment, as hereinabove described, the boost chopper circuit 400 further includes the first semiconductor package 17 that houses each of the first switch 30a and the second switch 31a and the fourth semiconductor package 10 that is provided separately from the first semiconductor package 17 and houses the fifth switch 130c. Thus, when either the first switch 30a or the fifth switch 130c fails, only the first semiconductor package 17 that houses the failing first switch 30a or only the fourth semiconductor package 10 that houses the failing fifth switch 130c can be replaced, and hence the replacement of the first switch 30a or the fifth switch 130c that requires no replacement can be prevented. Similarly to the relationship between the first switch 30a and the fifth switch 130c, when either the second switch 31a or the fifth switch 130c fails, the replacement of the second switch 31a or the fifth switch 130c that requires no replacement can be prevented.

Modification

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

Figure 5:
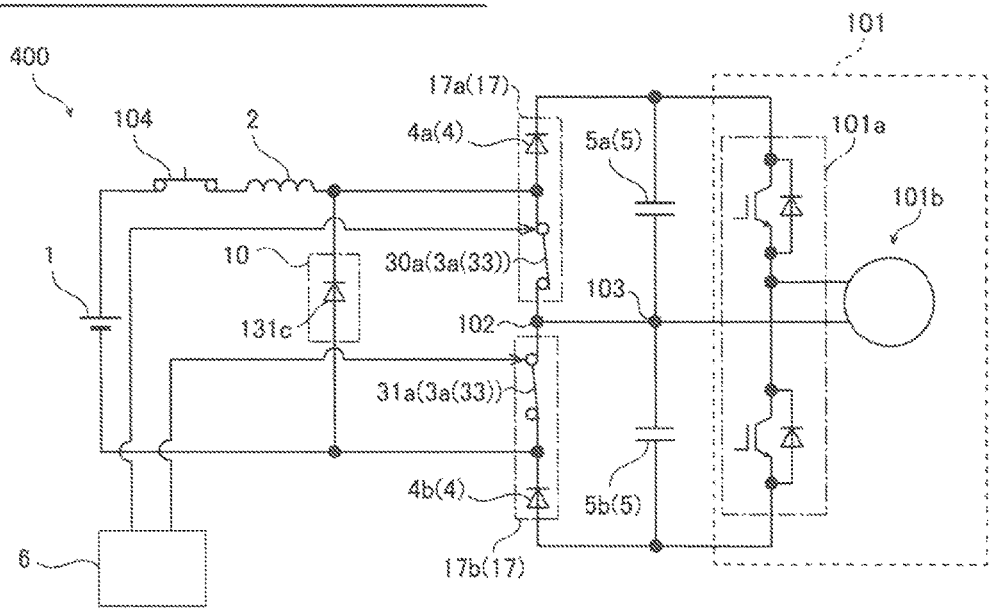
FIG. 5 is a diagram showing the circuit structure of a two-level boost chopper circuit according to a modification of the fourth embodiment of the present invention.

For example, while the single fifth switch 130c is connected in parallel to both the first switch 30a and the second switch 31a in the aforementioned fourth embodiment, the present invention is not restricted to this. As shown in FIG. 5, for example, a single antiparallel diode 131c may alternatively be connected in anti-parallel to both the first switch 30a and the second switch 31a. In this case, when the first switch 30a has a short-circuit fault, a voltage substantially equal to the voltage of the second capacitor 5b is applied to each of the second switch 31a and the antiparallel diode 131c. The withstand voltage of the antiparallel diode 131c is lower than each of the withstand voltage of the second switch 31a and the withstand voltage of the second capacitor 5b, and hence the antiparallel diode 131c fails before the second switch 31a or the second capacitor 5b fails. Consequently, a series resonant current flows from the direct-current output circuit 1 through the reactor 2 and the short-circuited antiparallel diode 131c. After this state is obtained, the current breaker 104 breaks electrical connection between the direct-current output circuit 1 and the reactor 2.

Figure 6:
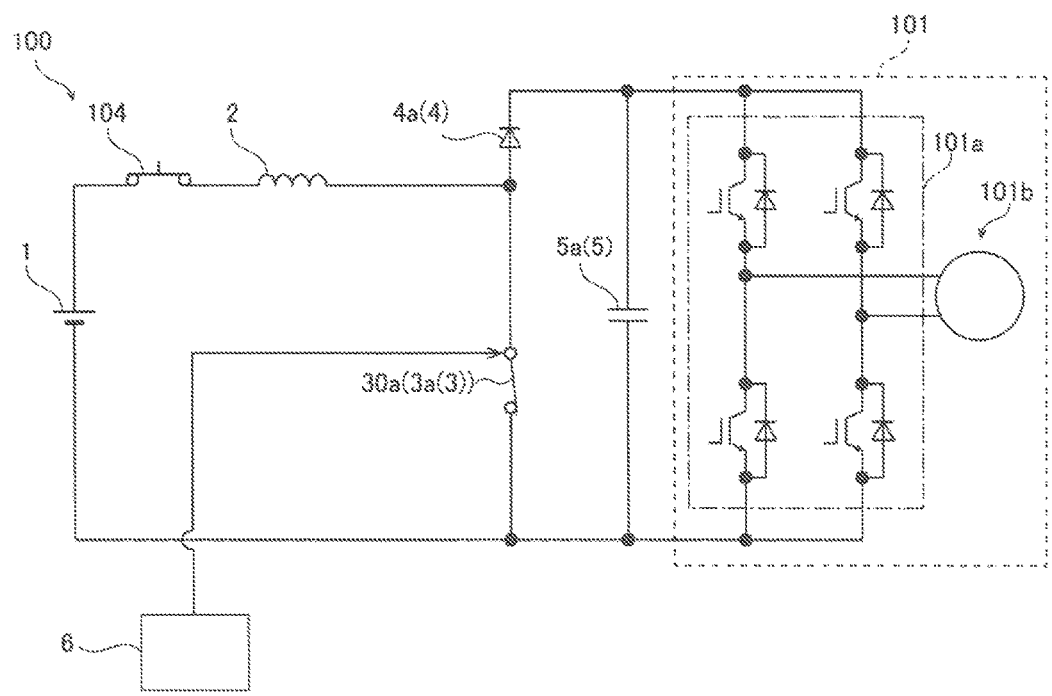
FIG. 6 is a diagram showing the circuit structure of a two-level boost chopper circuit according to a modification of the first embodiment of the present invention.

While the boost chopper circuit 100 is a three-level boost chopper circuit in the aforementioned first embodiment, the present invention is not restricted to this. As shown in FIG. 6, for example, the boost chopper circuit 100 may alternatively be a two-level boost chopper circuit. In this case, a voltage substantially equal to the voltage of the first capacitor 5a is applied to the first switch 30a when the first switch 30a is open. The withstand voltage of the first switch 30a is lower than the withstand voltage of the first capacitor 5a, and hence the first switch 30a fails before the first capacitor 5a fails. Consequently, a series resonant current flows from the direct-current output circuit 1 through the reactor 2 and the short-circuited first switch 30a. After this state is obtained, the current breaker 104 breaks electrical connection between the direct-current output circuit 1 and the reactor 2.

Figure 7:
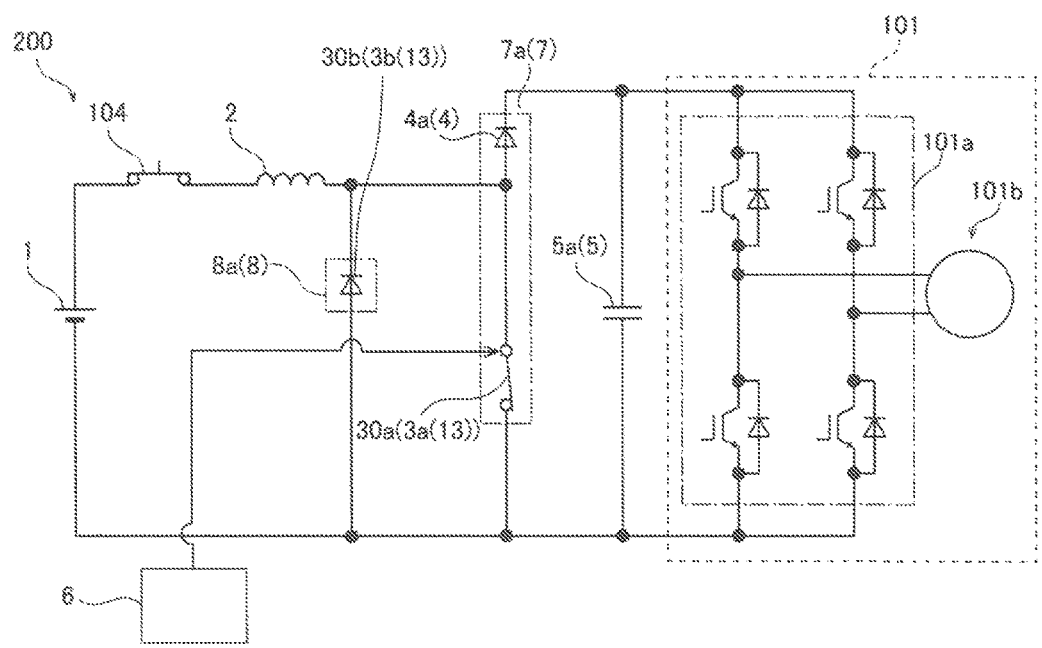
FIG. 7 is a diagram showing the circuit structure of a two-level boost chopper circuit according to a modification of the second embodiment of the present invention.

While the boost chopper circuit 200 is a three-level boost chopper circuit in the aforementioned second embodiment, the present invention is not restricted to this. As shown in FIG. 7, for example, the boost chopper circuit 200 may alternatively be a two-level boost chopper circuit. In FIG. 7, the first antiparallel diode 30b is connected in anti-parallel to the first switch 30a. In this case, a voltage substantially equal to the voltage of the first capacitor 5a is applied to each of the first switch 30a and the first antiparallel diode 30b when the first switch 30a is open. The withstand voltage of the first antiparallel diode 30b is lower than each of the withstand voltage of the first switch 30a and the withstand voltage of the first capacitor 5a, and hence the first antiparallel diode 30b fails before the first switch 30a or the first capacitor 5a fails. Consequently, a series resonant current flows from the direct-current output circuit 1 through the reactor 2 and the short-circuited first antiparallel diode 30b. After this state is obtained, the current breaker 104 breaks electrical connection between the direct-current output circuit 1 and the reactor 2. Alternatively, the first antiparallel diode 30b may be connected in anti-parallel to the first capacitor 5a.

Figure 8:
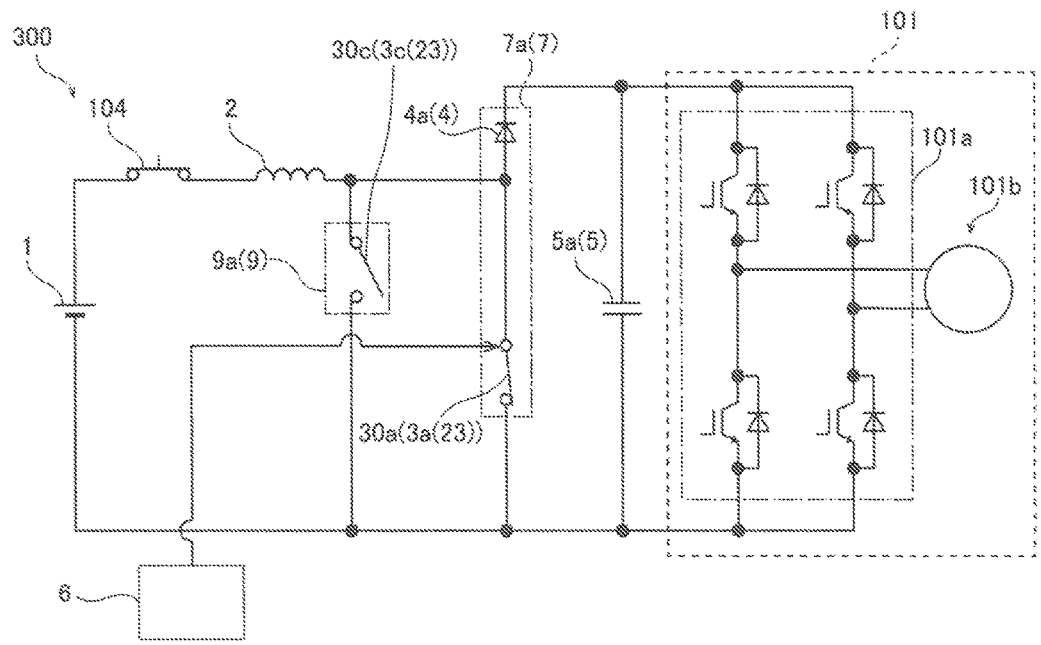
FIG. 8 is a diagram showing the circuit structure of a two-level boost chopper circuit according to a modification of the third embodiment of the present invention.

While the boost chopper circuit 300 is a three-level boost chopper circuit in the aforementioned third embodiment, the present invention is not restricted to this. As shown in FIG. 8, for example, the boost chopper circuit 300 may alternatively be a two-level boost chopper circuit. In FIG. 8, the third switch 30c is connected in parallel to the first switch 30a. In this case, a voltage substantially equal to the voltage of the first capacitor 5a is applied to each of the first switch 30a and the third switch 30c when the first switch 30a is open. The withstand voltage of the third switch 30c is lower than each of the withstand voltage of the first switch 30a and the withstand voltage of the first capacitor 5a, and hence the third switch 30c fails before the first switch 30a or the first capacitor 5a fails. Consequently, a series resonant current flows from the direct-current output circuit 1 through the reactor 2 and the short-circuited third switch 30c. After this state is obtained, the current breaker 104 breaks electrical connection between the direct-current output circuit 1 and the reactor 2. Alternatively, the third switch 30c may be connected in parallel to the first capacitor 5a.

While each of the first switch 30a, the second switch 31a, the first backflow prevention diode 4a, and the second backflow prevention diode 4b is not housed in a package in the aforementioned first embodiment, the present invention is not restricted to this. For example, each of the first switch 30a, the second switch 31a, the first backflow prevention diode 4a, and the second backflow prevention diode 4b may alternatively be housed in a separate package. Alternatively, the first switch 30a and the first backflow prevention diode 4a may be housed in a single package, and the second switch 31a and the second backflow prevention diode 4b may be housed in a single package separate from the package that houses the first switch 30a and the first backflow prevention diode 4a. Alternatively, the first switch 30a and the second switch 31a may be housed in a single package. In addition to these structures, a switching device having a withstand voltage substantially equal to that of each of the first backflow prevention diode 4a and the second backflow prevention diode 4b may alternatively be connected in anti-parallel to each of the first backflow prevention diode 4a and the second backflow prevention diode 4b.

While the first switch 30a, the second switch 31a, the first backflow prevention diode 4a, the second backflow prevention diode 4b, the first antiparallel diode 30b (third switch 30c), and the second antiparallel diode 31b (fourth switch 31c) are housed in the separate packages, respectively, in the aforementioned second (third) embodiment, the present invention is not restricted to this. For example, the first switch 30a and the first backflow prevention diode 4a may alternatively be housed in a single package, and the second switch 31a and the second backflow prevention diode 4b may alternatively be housed in a single package separate from the package that houses the first switch 30a and the first backflow prevention diode 4a. Alternatively, the first switch 30a and the second switch 31a may be housed in a single package. Alternatively, the first antiparallel diode 30b (third switch 30c), and the second antiparallel diode 31b (fourth switch 31c) may be housed in a single package. Alternatively, the first backflow prevention diode 4a and the first antiparallel diode 30b (third switch 30c) may be housed in a single package, and the second backflow prevention diode 4b and the second antiparallel diode 31b (fourth switch 31c) may be housed in a single package separate from the package that houses the first backflow prevention diode 4a and the first antiparallel diode 30b (third switch 30c).

While the first antiparallel diode 30b (third switch 30c) and the second antiparallel diode 31b (fourth switch 31c) are connected in parallel to the first switch 30a and the second switch 31a, respectively, in the aforementioned second (third) embodiment, the present invention is not restricted to this. For example, the first antiparallel diode 30b (third switch 30c) may alternatively be connected in parallel to the first capacitor 5a, and the second antiparallel diode 31b (fourth switch 31c) may alternatively be connected in parallel to the second capacitor 5b. In this case, the first antiparallel diode 30b (third switch 30c) and the first capacitor 5a may constitute a single module, and the second antiparallel diode 31b (fourth switch 31c) and the second capacitor 5b may constitute a single module separate from the module constituted by the first antiparallel diode 30b (third switch 30c) and the first capacitor 5a.

What is claimed is:

1. A boost chopper circuit comprising:
a reactor;
a switching device circuit connected to opposite ends of a direct-current output circuit through the reactor;
a backflow prevention diode circuit connected in series to the switching device circuit; and
a capacitor circuit connected in series to the backflow prevention diode circuit between opposite ends of the switching device circuit,
wherein a withstand voltage of at least one device in the switching device circuit is lower than a withstand voltage of the capacitor circuit.

2. The boost chopper circuit according to claim 1, wherein the at least one device in the switching device circuit, the withstand voltage of which is lower than the withstand voltage of the capacitor circuit, includes a device constructed of a semiconductor other than a wide band gap semiconductor.

3. The boost chopper circuit according to claim 1, wherein the switching device circuit includes a first switching device, and
a withstand voltage of the first switching device is lower than the withstand voltage of the capacitor circuit.

4. The boost chopper circuit according to claim 3, wherein the first switching device includes a first switch and a second switch connected in series to the first switch,
the backflow prevention diode circuit includes a first backflow prevention diode connected in series to the first switch and a second backflow prevention diode connected in series to the second switch,
the capacitor circuit includes a first capacitor connected in series to the first backflow prevention diode and a second capacitor connected in series to the second backflow prevention diode between the opposite ends of the switching device circuit,
a first connection that connects the first switch to the second switch and a second connection that connects the first capacitor to the second capacitor are connected to each other, and
a withstand voltage of the first switch is lower than a withstand voltage of the first capacitor while a withstand voltage of the second switch is lower than a withstand voltage of the second capacitor.

5. A boost chopper circuit comprising:
a reactor;
a switching device circuit connected to opposite ends of a direct-current output circuit through the reactor, and including a first switching device and an antiparallel diode element connected in anti-parallel to the first switching device;
a backflow prevention diode circuit connected in series to the switching device circuit; and
a capacitor circuit connected in series to the backflow prevention diode circuit between opposite ends of the switching device circuit,
wherein a withstand voltage of at least one device in the switching device circuit is lower than a withstand voltage of the capacitor circuit, and
a withstand voltage of the antiparallel diode element is lower than the withstand voltage of the capacitor circuit.

6. The boost chopper circuit according to claim 5, wherein the first switching device includes a switching device constructed of a wide band gap semiconductor, and the antiparallel diode element includes an antiparallel diode constructed of a semiconductor other than the wide band gap semiconductor.

7. The boost chopper circuit according to claim 5, wherein the first switching device includes a first switch and a second switch connected in series to the first switch,
the backflow prevention diode circuit includes a first backflow prevention diode connected in series to the first switch and a second backflow prevention diode connected in series to the second switch,
the capacitor circuit includes a first capacitor connected in series to the first backflow prevention diode and a second capacitor connected in series to the second backflow prevention diode between the opposite ends of the switching device circuit,
the antiparallel diode element includes a first antiparallel diode connected in anti-parallel to the first switch and a second antiparallel diode connected in anti-parallel to the second switch,
a first connection that connects the first switch to the second switch and a second connection that connects the first capacitor to the second capacitor are connected to each other, and
a withstand voltage of the first antiparallel diode is lower than a withstand voltage of the first capacitor while a withstand voltage of the second antiparallel diode is lower than a withstand voltage of the second capacitor.

8. A boost chopper circuit comprising:
a reactor;
a switching device circuit connected to opposite ends of a direct-current output circuit through the reactor, and including a first switching device and a second switching device connected in parallel to the first switching device;
a backflow prevention diode circuit connected in series to the switching device circuit; and
a capacitor circuit connected in series to the backflow prevention diode circuit between opposite ends of the switching device circuit,
wherein a withstand voltage of at least one device in the switching device circuit is lower than a withstand voltage of the capacitor circuit, and
a withstand voltage of the second switching device is lower than the withstand voltage of the capacitor circuit.

9. The boost chopper circuit according to claim 8, wherein the first switching device includes a switching device constructed of a wide band gap semiconductor, and the second switching device includes a switching device constructed of a semiconductor other than the wide band gap semiconductor.

10. The boost chopper circuit according to claim 8, wherein
the first switching device includes a first switch and a second switch connected in series to the first switch,
the backflow prevention diode circuit includes a first backflow prevention diode connected in series to the first switch and a second backflow prevention diode connected in series to the second switch,
the capacitor circuit includes a first capacitor connected in series to the first backflow prevention diode and a second capacitor connected in series to the second backflow prevention diode between the opposite ends of the switching device circuit, the second switching device includes a third switch connected in parallel to the first switch and a fourth switch connected in parallel to the second switch, a first connection that connects the first switch to the second switch and a second connection that connects the first capacitor to the second capacitor are connected to each other, and a withstand voltage of the third switch is lower than a withstand voltage of the first capacitor while a withstand voltage of the fourth switch is lower than a withstand voltage of the second capacitor.

11. The boost chopper circuit according to claim 8, wherein the first switching device includes a first switch and a second switch connected in series to the first switch, the backflow prevention diode circuit includes a first backflow prevention diode connected in series to the first switch and a second backflow prevention diode connected in series to the second switch, the capacitor circuit includes a first capacitor connected in series to the first backflow prevention diode and a second capacitor connected in series to the second backflow prevention diode between the opposite ends of the switching device circuit, the second switching device includes a single fifth switch connected in parallel to the first switching device, a first connection that connects the first switch to the second switch and a second connection that connects the first capacitor to the second capacitor are connected to each other, and a withstand voltage of the fifth switch is lower than each of a withstand voltage of the first capacitor and a withstand voltage of the second capacitor.

* * * * *

UNITED STATES PATENT AND TRADEMARK OFFICE
CERTIFICATE OF CORRECTION

PATENT NO. : 10,164,523 B2
APPLICATION NO. : 15/468369
DATED : December 25, 2018
INVENTOR(S) : Motoyoshi Kubouchi et al.

It is certified that error appears in the above-identified patent and that said Letters Patent is hereby corrected as shown below:

On the Title Page

Please change the number of item (30) Foreign Application Priority Data, from "… 2013-096404" to --… 2016-096404--.

Signed and Sealed this
Sixteenth Day of April, 2019

Andrei Iancu
*Director of the United States Patent and Trademark Office*